H. C. BROOKS.
PRUNING SHEARS.
APPLICATION FILED AUG. 26, 1913.
1,117,776.
Patented Nov. 17, 1914.
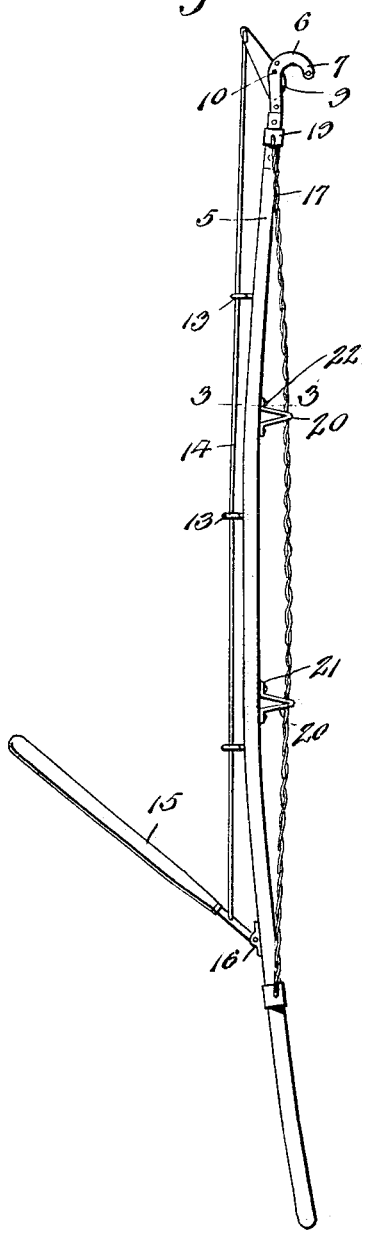
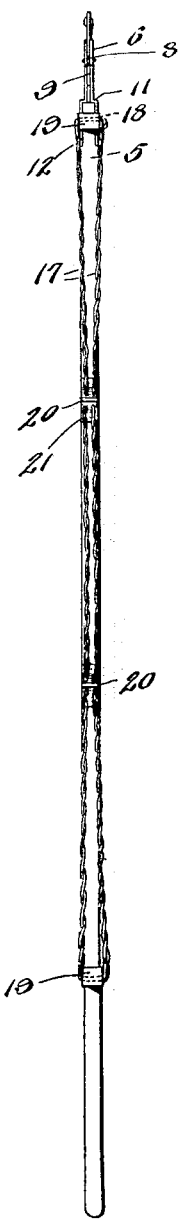
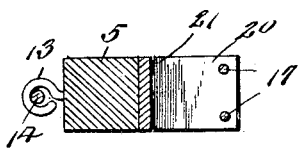
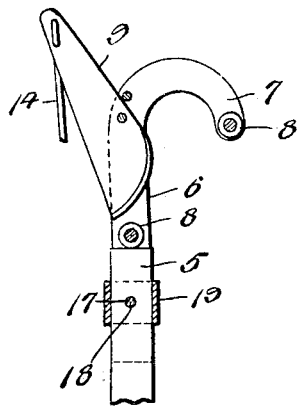
Inventor
H. C. Brooks,
By Victor J. Evans
Attorney

UNITED STATES PATENT OFFICE.

HARRY C. BROOKS, OF WASHINGTON, DISTRICT OF COLUMBIA.

PRUNING-SHEARS.

1,117,776.  Specification of Letters Patent.  Patented Nov. 17, 1914.

Application filed August 26, 1913. Serial No. 786,721.

*To all whom it may concern:*

Be it known that I, HARRY C. BROOKS, a citizen of the United States, residing at Washington, in the District of Columbia, have invented new and useful Improvements in Pruning-Shears of which the following is a specification.

The invention relates to a pruning implement, and more particularly to the class of trussed poles for pruning shears.

The primary object of the invention is the provision of an implement of this character wherein the pole or handle thereof is reinforced and strengthened through the medium of truss wires, the trussed construction being of novel form so as to assure maximum strength to the implement.

Another object of the invention is the provision of an implement of this character wherein the cutting head is mounted thereon in a novel manner and serves to materially reinforce or strengthen the pole or handle, which carries truss wires to assure strength and rigidity thereto.

A further object of the invention is the provision of an implement of this character which is extremely simple in construction, thoroughly reliable and efficient in operation, strong, durable, and also which is inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a side elevation of a pruning implement constructed in accordance with the invention. Fig. 2 is an edge elevation thereof. Fig. 3 is a sectional view on the line 3—3 of Fig. 1. Fig. 4 is a fragmentary vertical sectional view through the implement.

Similar reference characters indicate corresponding parts throughout the several views in the drawing.

Referring to the drawing in detail, the pruning implement comprises a pole or handle 5, which may be of any desirable length and of any shape in cross section, although in this instance the same is of rectangular shape in cross section and is preferably formed from wood. However, it may be made from other material. Mounted on one end of the pole or handle 5 is a head which is formed of two pieces of metal 6 riveted or otherwise secured together, the said pieces being curved in the form of a hook 7, while arranged between the said pieces are washers 8 which surround the rivets or other fasteners, thus forming a recess in which works the blade 9, the same being supported upon a pivot 10 for rocking movement. The pieces 6 are formed with out-turned portions 11 providing shoulders and also formed with parallel portions 12 which are adapted to lie against opposite sides of the end of the pole or handle 5, the parallel portions 12 being fastened to the pole in any suitable manner. This pole or handle 5 abuts against the out-turned shoulder portions 11 when the parallel portions 12 are secured thereto.

Mounted at intervals in the pole or handle 5 are guide eyes 13 through which is passed a pull rod 14, the same being loosely connected to the blade 9 and also loosely connected to a lever 15 which is pivoted in a bearing 16 mounted on the pole or handle 5 near the opposite end thereof. This lever 15 serves as an operating handle for actuating the blade 9 in the usual well-known manner.

Extending longitudinally of the pole or handle 5 are double truss wires 17, the same being passed through transverse openings 18 formed in reinforcing bands 19 and the pole or handle 5 respectively, the ends of the wires being united in any suitable manner. These truss wires 17 also pass through substantially inverted V-shaped brackets 20, the same being spaced a suitable distance apart, and each has formed thereon outturned ears 21 through which are passed fasteners 22 for securing the same to the pole or handle 5, it being understood that the truss wires 17 are drawn taut so that the pole or handle 5 is outwardly bowed as shown, thereby giving strength and rigidity to the same.

From the foregoing it is thought that the construction and manner of operation of the device will be clearly understood, and therefore a more extended explanation has been omitted.

What is claimed is:—

A trussed pole structure for pruning implements comprising a bowed pole, brackets fixed to the pole at the concaved side thereof, a flexible tension element engageable with the pole at two points thereof and spaced from the said pole by the brackets, and shear operating means on the convex side of the pole.

In testimony whereof I affix my signature in presence of two witnesses.

HARRY C. BROOKS.

Witnesses:
JOHN J. WILMARTH,
LOUISE S. WILMARTH.

Copies of this patent may be obtained for five cents each, by addressing the "Commissioner of Patents, Washington, D. C."